March 19, 1968 B. G. KERAMIDAS 3,374,108
FORMATION OF BARRIER LAYERS IN CADMIUM SULFIDE SOLAR CELLS
Filed June 18, 1964
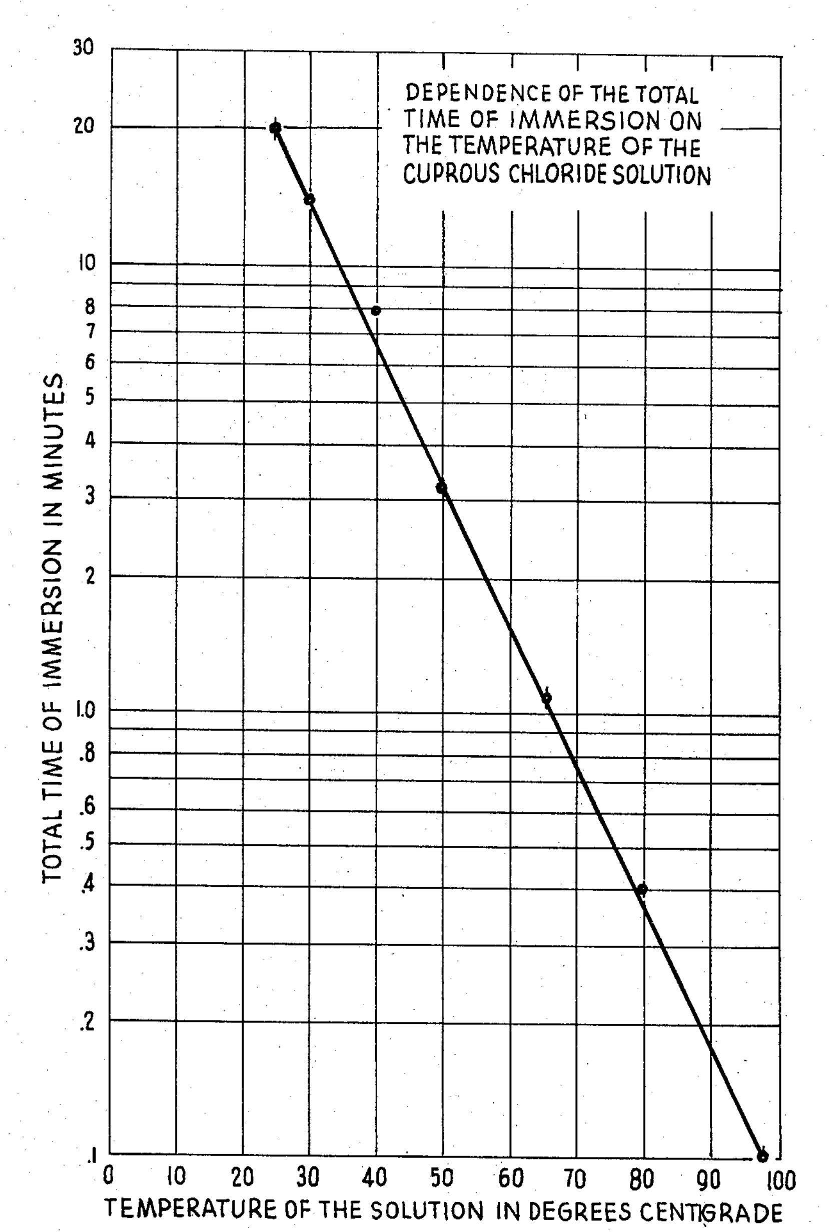
BASILIO G. KERAMIDAS, INVENTOR.
BY Robert K. Mihalek United States Patent Office 3,374,108

Patented Mar. 19, 1968

3,374,108

FORMATION OF BARRIER LAYERS IN CADMIUM SULFIDE SOLAR CELLS

Basilio G. Keramidas, Cleveland, Ohio, assignor, by mesne assignments, to Kewanee Oil Company, Bryn Mawr, Pa., a corporation of Delaware Filed June 18, 1964, Ser. No. 376,168
12 Claims. (Cl. 117—200)

ABSTRACT OF THE DISCLOSURE

This invention comprises a process for applying a "barrier layer" on a cadmium sulfide body designed for use as a photovoltaic cell comprising the steps of immersing the cadmium sulfide body in an aqueous solution of cuprous ions for a sufficient period of time, and, after removal of the cadmium sulfide body from the solution, removing any residual liquid adhering to the surface. The resultant barrier layer, which is believed to be cuprous sulfide, imparts a uniformly high efficiency to the photovoltaic cell.

This invention relates generally to a method of imparting a "barrier layer" in a body of cadmium sulfide in order to produce a photovoltaic cell. More particularly the invention relates to such a method wherein the body of cadmium sulfide is subjected to at least one and preferably several cycles of treatment involving immersing the body in an aqueous solution of cuprous ions for controlled periods of time and removing any residual material from said solution adhering to the surface thereof after each immersion.

The process of the present invention may be employed most advantageously and efficiently in the production of cadmium sulfide photovoltaic cells from cadmium sulfide in almost any form—thin layers of vacuum deposited polycrystalline cadmium sulfide and single crystals of cadmium sulfide are equally useful forms thereof for carrying out the present method. Examples of such cells to which the instant method particularly may be applied in the production thereof are described in Power Systems for Space Flight, Academic Press, volume II (1963), edited by M. A. Zipkin and R. N. Edwards. The cells described therein basically comprise a thin layer of polycrystalline cadmium sulfide evaporated onto an electrically conductive substrate. The relative proportion of cadmium to sulfur in the cadmium sulfide layer is adjusted to provide resistivities low enough for efficient conductance and provide also for other properties necessary for photovoltaic cells.

The significance of a "barrier layer" in the functionality or operation of a photovoltaic cell is well known. However in cadmium sulfide photovoltaic cells the exact nature of the "barrier layer" and the mechanism by which it operates is not fully understood.

The "barrier layer" in a cadmium sulfide cell is considered by many to be a layer of P-type semiconductor material which is integrally mated to N-type semi-conductor cadmium sulfide to comprise the photovoltaic cell. It is generally conceded that the P-type material is produced by an imperfectly understood interaction of cuprous ions and the surface of a cadmium sulfide body.

Many methods have been employed to effect the interaction between cuprous ions and the surface of cadmium sulfide in producing the barrier layer. See for example "A Cadmium Sulfide Solar Generator" by D. A. Hammond et al., published December 1957, WADC 57–770 ASTIA Document, AD 151,036, PB 151,276, pp. 58–68.

In addition to the various methods set forth in this article it was known prior to the present invention to impart barrier layers in single crystals of cadmium sulfide by immersing the crystal in a hot solution of cuprous chloride. The results were very inconsistent; some crystals showing no photovoltaic effect while those which did show some photovoltaic effect were inconsistently produced having very low efficiencies.

It has been discovered that the process of the present invention advantageously may be employed to impart consistently barrier layers in a cadmium sulfide layer, producing cells uniformly of high efficiency.

According to the present invention there is provided a method for imparting barrier layers in cadmium sulfide bodies which comprises subjecting the body or layer of cadmium sulfide to at least one cycle of treatment including in sequence the steps of—

(1) Immersing said body or layer in a solution of cuprous ions for a predetermined period of time, (2) Removing said body or layer from said solution, and (3) Removing any adhering residual material from said solution from said body or layer, preferably by rinsing with water and wiping with a soft material.

The figure of the drawing is a graph plotting on semi-log coordinates the log of the optimum total immersion time for the treatment versus the temperature of the solution.

Particularly characterizing the method of the present invention is the controlling of the times of immersion and the number of treatment cycles at the higher and intermediate temperatures (e.g. 40° C. to 97° C.).

As mentioned hereinbefore the graph of the figure plots the log of the optimum total time of immersion in minutes versus the temperature of the solution in degrees centigrade. The expression "optimum total time of immersion," means the amount of time a cadmium sulfide body or layer is immersed regardless of the number of cycles of treatment and wherein the maximum efficiency of the resulting photovoltaic cell is obtained at a given solution temperature.

Generally the optimum total time of immersion is determined with reasonable accuracy from the following equation:

(I) $$t=(140)\times 10^{-T/30\text{-}32}$$

where small $t$ equals the total time of immersion and T equals the temperature of the treating solution.

This Equation I was derived by extrapolating the curve of the figure to get the constant 140 and then differentiating the general equation for the curve to obtain the slope of the curve which is 1/30–32 or about 1/31.

Generally the efficiencies of the cells are shown to be higher when treated at elevated temperatures—temperatures above 40° C. with increasing values up to this temperature. At 40° C. about 8 minutes is about the optimum time for immersion.

The preferred mode of the present invention is carried out using solution temperatures above 45° C. and more preferably 50° C. At the elevated temperatures at least three cycles of treatment are used to obtain the best cells, the cells capable of giving the best conversion of energy. More than three cycles of treatment or immersion intervals may be used. No added advantage is obtained, however, in using more than three cycles and the total immersion time increases directly as the number of cycles is increased. As a general rule the preferred mode of the invention may be determined advantageously using the following formula in conjunction with the figure of the graph:

$$\text{Time of an immersion interval} = \frac{\text{Total time of immersion}}{n}$$

where $n$ is an integer ranging from 2.5–3.5.

Preferably the rinsing step is carried out using relatively cold water (distilled preferred), at room temperature (25° C.).

While the exact reasons for the noted increase in efficiency when lower temperature rinse water is used is not fully understood a partial explanation is thought to be as follows: The cadmium sulfide layer as it is removed from the solution of cuprous ions (usually cuprous chloride) carries small undissolved particles of cuprous chloride in the residual liquid on the surface of the cell. The particles, presumably by providing sites of high concentration of cuprous ions, continue to react after the cell is removed from solution forming a non-uniform barrier layer having discontinuities in the surface—discontinuities as to depth of interaction and as to electrical properties particularly.

The various compounds capable of providing cuprous ions are rather restricted because of the relative insolubilities of the lower valent copper salt. Cuprous chloride being the most water soluble is only poorly so, having a solubility in water of $11\times10^{-2}$ grams per liter at 25° C. Cuprous bromide and cuprous iodide are not this soluble but may be used also. However, cells produced using the iodide and bromide are not as efficient as those produced using the chloride.

It is preferred that the treating solution containing the cuprous salt be kept under an inert atmosphere or blanket during use and in between treatment. If the inert atmosphere is not maintained, the cuprous ion is oxidized fairly rapidly to cupric ion forming both the oxide and the higher valent salt; a disproportionation usually accompanies the oxidation whereby some copper metal is formed. The use of the inert atmosphere has been found to have a beneficial effect on the finished cell; one important effect being that the efficiencies of the resulting cells generally are increased.

The expression "inert" as used herein includes all gases which do not react with the solution and the materials comprising the cell. In addition to the noble gases which includes neon, argon and xenon, nitrogen, carbon dioxide and the hydrocarbon gases such as methane and the like and the fluoroinated hydrocarbon gases such as tetrafluoromethane (Freon) and the like may be used.

The pH of the cuprous ion solution preferably is kept on the acid side—at a pH of from about 2.5 to about 5 and more preferably at a pH of from about 3 to about 4. Cuprous ion solutions on the alkaline side may be used also but the resulting cells usually have lower efficiencies than those prepared using acid solutions.

As previously indicated the cadmium sulfide body or layer preferably is wiped dry after the rinsing thereof. Any residual and oxidized material not removed by the rinsing is usually removed completely by the wiping action. The character of the cell's surface after wiping appears visually to be more uniform, approaching homogeniety in texture and color. Before wiping and rinsing and usually before wiping and after rinsing the surface of the cell manifests visually, pronounced discolorations. In order not to damage the surface of the cell and cause harm to the "barrier layer" a relatively soft material should be used for wiping. Industrial wiping paper is particularly good for this purpose. Kimwipe is one example of one type of wiping paper which may be used. In order to enhance the removal of any moisture along with the wiping, the wiping paper may advantageously be dipped in acetone or methanol.

After the final wiping the fabrication of the cell may be completed or the cell may be subjected to a further treatment which comprises heating the cell at elevated temperatures, preferably in dry air. The subsequent heating of the cell has been found to upgrade significantly the efficiency of the cell—as much as a full percent or more. Temperatures at which the cell is heated advantageously are included in the range of from about 100° C. to about 300° C. and preferably in the range of from about 130° C. to about 180° C. The heating may be carried out conveniently in an ordinary drying oven well known to those skilled in the art.

In carrying out the method of the present invention the cadmium sulfide body or layer is masked around its edges to prevent the formation of channels of low resistivity which act to short circuit the cell in use.

In order that those skilled in the art may better understand how the present invention can be carried into effect the following examples are given by way of illustration and not by way of limitation. All parts and percentages are by weight unless otherwise specified.

*Examples I–VI*

The following procedure was used to prepare six samples. 500 ml. of distilled water was poured into a beaker equipped with gas dispersion tubes, and heated to 65° C. while bubbling dry nitrogen through it for about 30 minutes. 12.5 grams of cuprous chloride was added to the heated water which was agitated with a magnetic stirrer in order to facilitate the solution of CuCl particles. The 3" x 3" polycrystalline cadmium sulfide thin film was masked around the edges and immersed into the CuCl solution for 30 seconds, removed, rinsed with cold distilled water and wiped with a Kimwipe wetted in acetone. The film was immersed for another interval of 30 seconds, removed again, rinsed and wiped off as before. Finally the cadmium sulfide layer is re-immersed for another interval of 30 seconds, repeating the rinsing and the wiping. The mask is removed. The cells were heated in dry air for 15 minutes at 150° C.

The cell was then completed by laminating under pressure, a gold grid in electrical contact with the barrier layer and outer layers of H Film sandwiching the cell. The layers of H Film extend peripherally beyond the edges of the cell permitting them to be sealed and act to seal the cell. H Film is a resinous material in film form comprising a polyimide formed by the reaction of an aromic tetrabasic acid and an aromatic diamine. A description of the physical properties of the film is set forth in a published paper by W. E. Tatum et al. presented at the Electrical Insulation Conference, Sept. 17, 1963 at Chicago, Ill.

The efficiencies of each of the sections (cells) were determined by measuring the relative "rectangularity" of the current voltage (I–V) characteristic curve produced by plotting the current versus the voltage from a closed circuit containing a cell in series with a voltage source; the current and voltage were measured by a calibrated oscilloscope. The procedure for measuring the rectangularity of the I–V curve entails measuring the continuous change in voltage and current going from the open circuit voltage to the short circuit current of the cell, plotting the voltage versus the current and measuring the rectangularity of the curve which is proportional to the slope of the curve. The efficiency of the cell is determined by first finding the point on the curve which gives the maximum rectangularity and multiplying the current defined by this point by the voltage defined by this point to obtain the power output of the cell and dividing the power output of the cell by the power input. For the instant measurements a power value for the light of 100 milliwatts per square centimeter was used.

| Example | Voltage | Current (ma.) | Area of Cell (cm.$^2$) | Efficiency (percent) | Current Density (ma./cm.$^2$) |
|---|---|---|---|---|---|
| I | .44 | 48 | 3.50 | 3.91 | 13.7 |
| II | .45 | 42 | 3.85 | 3.36 | 10.9 |
| III | .44 | 51 | 3.20 | 4.43 | 15.9 |
| IV | .43 | 57 | 3.35 | 5.05 | 17.0 |
| V | .46 | 47 | 3.30 | 4.26 | 14.3 |
| VI | .44 | 57 | 3.40 | 4.35 | 16.7 |

Average Efficiency, 4.23%.

*Example VII*

When the procedure outlined for Examples I–VI is repeated except that the cuprous chloride solution is heated to 97° C. and the cadmium sulfide layer is immersed in the solution three times, the first immersion for 4 seconds and the last two immersions for 3 seconds each, and subsequently heated for 15 minutes at 150° C., the resulting cell has an efficiency of at least 4 percent.

*Example VIII*

Again using the same procedure the cadmium sulfide layer is immersed for 8 minutes in a cuprous chloride solution held at 40° C. The resulting cell has an efficiency of above 3.9 percent.

Also envisaged for the present invention is the use of polar solvents other than water. Examples of polar solvents other than water which may be used to dissolve cuprous ions include dimethylformamide, formamide, dioxane, tetrahydrofuran, 1,2-dimethoxyethane (Glyme) and the like.

While specific examples of the invention have been set forth hereinabove, it is not intended that the invention be limited solely thereto, but to include all of the variations and modifications falling within the scope of the appended claims.

Having thus described the invention, what is claimed is:

1. A method for producing a barrier layer in a cadmium sulfide body comprising subjecting said cadmium sulfide body to at least one cycle of treatment including the steps of (1) immersing said body in an aqueous solution of cuprous ions at about 25° C. to about 97° C. for from about 0.1 to 20 minutes, (2) removing said body from said solution, and (3) removing any residue from said solution from said body.

2. The method of claim 1 wherein said residue is removed by rinsing said body with water and wiping said body.

3. The method of claim 2 wherein said cadmium sulfide body is subjected to at least three cycles of treatment and said solution of cuprous ions is maintained at a temperature of at least 40° C.

4. The method of claim 3 wherein said solution of cuprous ions is kept in an inert atmosphere and said rinse water is at about room temperature.

5. The method of claim 4 wherein said cadmium sulfide body is heated subsequently to a temperature in the range of from about 100° C. to about 250° C.

6. A method for producing a barrier layer in a body of cadmium sulfide comprising subjecting said body of cadmium sulfide to at least three cycles of treatment including the steps of (1) immersing said body in an aqueous solution of cuprous ions at a temperature of at least 40° C. and which is maintained in an inert atmosphere, (2) removing said body from said solution after a certain definite period of time, (3) rinsing said body with water having a temperature below about room temperature, and (4) wiping said body; the total immersion time is approximately determined by the equation $$t=(140)\times 10^{-T/30-32}$$

wherein $t$ is total immersion time in minutes and T is the temperature of said aqueous solution of cuprous ions in degrees centigrade.

7. The method of claim 6 wherein the cuprous ions are provided by a cuprous salt comprising cuprous iodine.

8. The method of claim 6 wherein the cuprous ions are provided by a cuprous salt comprising cuprous bromide.

9. The method of claim 6 wherein the cuprous ions are provided by a cuprous salt comprising cuprous chloride.

10. The method of claim 9 wherein the solution of cuprous chloride contains some undissolved cuprous chloride and wherein the cadmium sulfide body is subjected to three cycles of treatment and the total immersion time is determined from the temperature of the solution by correlation therewith according to the graph of the figure in the drawing.

11. The method of claim 10 wherein said cadmium sulfide further is heated to a temperature in the range of from about 100° C. to about 300° C.

12. The method of claim 11 wherein said temperature is in the range of from about 130° C. to about 180° C.

References Cited

UNITED STATES PATENTS 3,238,150 3/1966 Behringer ---------- 117—201

FOREIGN PATENTS 919,727 5/1955 Germany.

WILLIAM L. JARVIS, *Primary Examiner.*